United States Patent

Boggs

[11] 3,871,719
[45] Mar. 18, 1975

[54] TRACK ROLLER WITH REPLACEABLE COILED TREAD

[75] Inventor: Roger L. Boggs, East Peoria, Ill.

[73] Assignee: Caterpillar Tractor Co., Peoria, Ill.

[22] Filed: Feb. 1, 1974

[21] Appl. No.: 438,666

[52] U.S. Cl.................... 305/28, 308/18, 74/230.5
[51] Int. Cl............................................ B62d 55/14
[58] Field of Search............ 305/11, 21, 22, 28, 36, 305/37, 52; 74/229, 230.2, 256; 308/18, 20, 237 A; 29/121, 126, 27, 28

[56] References Cited
UNITED STATES PATENTS
2,429,670  10/1947  Crews.................................. 29/127
3,586,398  6/1971  Dadds................................. 308/18

*Primary Examiner*—Philip Goodman
*Assistant Examiner*—John A. Carroll
*Attorney, Agent, or Firm*—Wegner, Stellman, McCord, Wiles & Wood

[57] ABSTRACT

An improved tractor roller assembly including a shaft adapted to be affixed to the tractor and a hub rotatably received thereon. The hub, on opposite ends, mounts a pair of treads as well as at least two guide flanges. The treads are defined by a plurality of convolutions, preferably in the form of a helix.

7 Claims, 2 Drawing Figures

PATENTED MAR 18 1975 3,871,719

TRACK ROLLER WITH REPLACEABLE COILED TREAD

BACKGROUND OF THE INVENTION

This invention relates to track roller assemblies for crawler type vehicles and, more particularly, to an improved tread in such assemblies.

Representative prior art includes U.S. Pat. Nos. 2,804,358; 2,909,938; 3,154,958; 3,178,239; 3,515,466; 3,580,093; and 3,586,398, of which patents 2,909,938; 3,154,958; and 3,178,239 appear most pertinent.

Crawler type tractors and, particularly, the tracks thereof, are subject to substantial abuse during use simply due to the hostile environment in which they are intended to operate. As is well-known, such tractors are frequently employed in building roads, clearing areas, earth moving and transport of other vehicles in severe terrain.

Such operating environments require that the crawler type tractor undergo multiple turning movements to allow it to be aligned with the work, as rocks or trees or simply in traversing side hill areas. Such multiple turning movements cause substantial side loading of the track chain with the result that such side loading is inevitably transferred to the drive sprockets, idlers and track rollers.

Customarily, the track roller assemblies include so-called "treads" or "rims" which tend to bellmouth over their life because of the compressive loads established regardless of the qaulity of the metal employed in fabricating the treads. Of course, the continued increase in horsepower and weight of crawler type tractors and the increasingly severe operating environments in which they are employed makes improved service techniques desirable to reduce down time and service cost. By providing component parts, such as the treads, that are long-lived and, are such that when failure inevitably results, they may be readily replaced.

SUMMARY OF THE INVENTION

It is the principal object of the invention to provide a new and improved track roller assembly for use with crawler-type vehicles. More specifically, it is an object of the invention to provide such an assembly including improved, long-lived treads that are easily replaceable.

The exemplary embodiment of the invention achieves the foregoing objects in a structure including a shaft which is adapted to be fixed to a tractor frame and which rotatably mounts a hub. The hub, in turn, adjacent its ends, receives the treads and guide flanges.

The treads, according to the invention, are formed of a plurality of convolutions which may be defined by at least one strip of material. In a highly preferred embodiment, the plurality of convolutions are defined by a helix with each convolution in the helix being in abutment with the adjacent convolution.

The number of convolutions is sufficient so that, if one breaks, there will be sufficient convolutions remaining having an arc length in excess of 180° to thereby continue to grip the hub to continue in service. Preferably, each end of the hub includes the aforementioned guide flange and an axially inner flange between which the helix is tightly received.

One end of the helix is provided with a key to key the same to the hub and the same is further constructed and arranged so that there is at least one circumferentially extending gap at an end thereof so as to allow the tread to grow during use.

The convolutions are provided with radially outer surfaces defining a cylindrical surface.

Other objects and advantages will become apparent from the following specification taken in conjunction with the accompanying drawings.

DESCRIPTION OF THE PREFERRED EMBODIMENT

Figure 1:
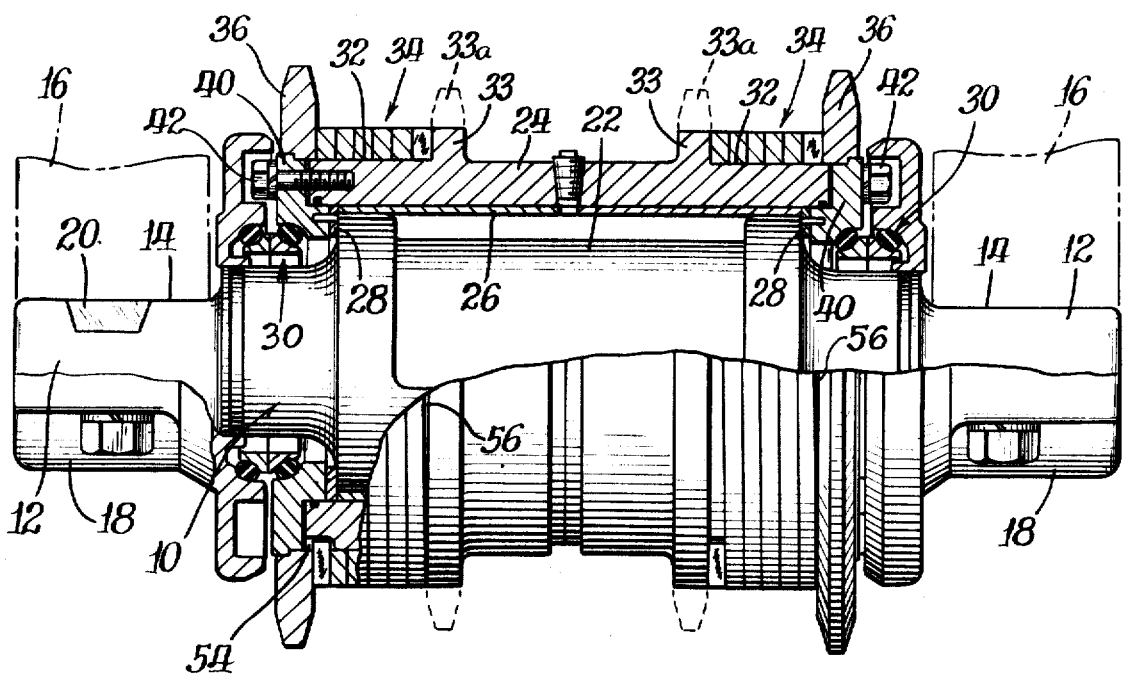
FIG. 1 is a front elevation of a tractor roller assembly made according to the invention with parts broken away for clarity.

An exemplary embodiment of a track roller assembly made according to the invention is illustrated in FIG. 1 and is seen to include a shaft, generally designated 10, having reduced ends 12, each of which, in turn, includes a flat 14 in abutment with the underside of parallel rails shown in phantom at 16, and forming part of the tractor frame. Mounting collars 18 secure the shaft 10 in place on the rails 16 with the flats 14 precluding rotation of the shaft 10 relative to the rail 16. In addition, keying means 20 of any suitable form may be employed at the interface of the flats 14 and the rails 16 to preclude axial shifting of the shaft 10.

The shaft 10 includes an enlarged central portion including a lubricant receiving pocket 22 and journalled on the central portion of the shaft 10 is a hub 24. A sleeve bearing 26 and thrust bearings 28 are employed for this purpose. Adjacent each end of hub 24, suitable seals, generally designated 30, are employed to preclude the entry of foreign material into the bearing area and to retain lubricant therein.

Opposite ends of the hub 24 include rim or tread receiving surfaces 32 which are defined by the areas between axially inner flanges 33 and the ends of the hub. The flanges 33 may be integral with the hub 24 as illustrated or, could be separate guide flanges as indicated in phantom at 33a made according to the teachings of my co-pending application Ser. No. 424,095, entitled "Track Roller Assembly," filed Jan. 15, 1974 and assigned to the same assignee as the instant application.

Received on each tread receiving surface 32 is a tread, generally designed 34, and which is held in place between the flanges 33 by axially outer guide flanges 36 which are mounted on the ends of the hub 24 by associated retaining rings 40 and bolts 42. Again, the guide flanges 36 may either be formed as illustrated or according to the teachings of my above-identified co-pending application, the disclosure of which is herein incorporated by reference.

Figure 2:
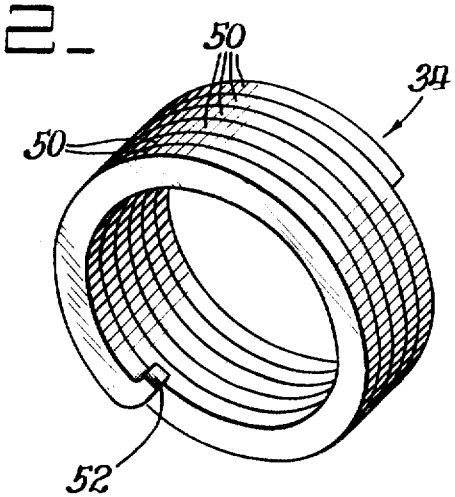
FIG. 2 is a perspective view of one tread employed in the assembly and made according to the invention.

With reference to both FIGS. 1 and 2, the treads 34 will now be described. Each is seen to be formed of a plurality of convolutions 50 in side-by-side relationship. In a preferred form of the invention, the convolutions 50 are defined by a single helix having an inturned key 52 at one end thereof. Each convolution is generally rectangular in cross section so that the radially outer surfaces thereof define a cylindrical surface. Moreover, the convolutions are in abutment with each other.

According to the preferred embodiment, where the convolutions 50 are formed by a single helix, the same may be fabricated through conventional coil winding techniques from a single strip of metal and suitably annealed and case hardened.

When assembled on the hub 24, the key 52 of each tread 34 is received in a small key way 54 formed in each end of the hub 24. Preferably, the width of each tread 34 is such that when the associated flange 36 is secured in place, the tread 34 will substantially fill the space between the associated flange 33. Nonetheless, because, in the preferred embodiment, the tread 34 is defined by a helix, and no effort is made to taper the sides of the endmost convolutions 50, at least one small gap 56 will exist between the tread 34 and the associated flange 33 as well as a similar gap between the opposite side of the tread 34 and the guide flange 36.

Finally, the number of convolutions 50 employed is made sufficient so that, if one or more breaks, there will be a sufficient number of segments having an arc length of more than 180° remaining so that the unit will still be operable. That is, there should be a sufficient number of convolutions 50 such in the foregoing event, at all times during rotation of the hub, a cylindrical surface, albeit with interruptions axially, but no interruptions circumferentially, will be presented to the track. Generally, 3 to 6 convolutions will suffice.

A substantial advantage of a track roller assembly made according to the invention exists due to the ability of the coils to grow into the gap 56. In particular, as is well known, the treads 34 are subject to radially directed high impact loads during use continually peening the outer surface of the coils. This places the outer surface of the coils in compression which tends to cause the treads 34 to "grow" and "curl." Such growth will principally be in the circumferential direction although there will be growth in an axial direction as well. Because of the presence of the gap, such growth can be accommodated therein with the result that, as wear occurs, the treads 34 will maintain a tight wind about the hubs 24.

From the foregoing, it will be seen that the invention provides a new and improved tread which can be readily produced on automated equipment to any desired size. The use of plural convolutions in sufficient number, for the purposes mentioned previously, extends the operability of the tread even though breakage occur in one or more of the convolutions.

I claim:

1. In a track roller assembly including a shaft adapted to be affixed to a tractor, a hub rotatably received on the shaft, a pair of treads on opposite ends of the hub and at least two guide flanges, one on each end of said hub, the improvement wherein each of said treads is defined by a plurality of metallic convolutions in side-by-side relationship.

2. The track roller assembly of claim 1 wherein said convolutions are keyed to said assembly at one end thereof.

3. The track roller assembly of claim 1 wherein said convolutions are defined by a helix.

4. The track roller assembly of claim 3 wherein said convolutions are in abutting relation and have radially outer surfaces defining a cylindrical surface.

5. The track roller assembly of claim 4 wherein each end of said hub, in addition to said guide flange, includes an axially inner flange, each said helix being received between an associated one of said guide flanges and axially inner flanges.

6. The track roller assembly of claim 1 wherein each end of said hub, in addition to said guide flange, includes an axially inner flange, each of said plurality of convolutions being received between an associated one of said guide flanges and said axially inner flanges.

7. The track roller assembly of claim 6 wherein each of said plurality of convolutions is constructed and arranged to have at least one circumferentially extending gap to allow for circumferential growth of said treads during use.

* * * * *